(12) United States Patent
Bauza et al.

(10) Patent No.: US 7,735,358 B2
(45) Date of Patent: *Jun. 15, 2010

(54) SELF-SENSING TWEEZER DEVICES AND ASSOCIATED METHODS FOR MICRO AND NANO-SCALE MANIPULATION AND ASSEMBLY

(75) Inventors: Marcin B. Bauza, Charlotte, NC (US); Shane C. Woody, Charlotte, NC (US); Stuart T. Smith, Charlotte, NC (US)

(73) Assignee: Insitutec, Inc., Charlotte, NC (US)

( * ) Notice: Subject to any disclaimer, the term of this patent is extended or adjusted under 35 U.S.C. 154(b) by 138 days.

This patent is subject to a terminal disclaimer.

(21) Appl. No.: 11/818,669

(22) Filed: Jun. 15, 2007

(65) Prior Publication Data

US 2007/0240516 A1    Oct. 18, 2007

Related U.S. Application Data

(63) Continuation-in-part of application No. 10/989,744, filed on Nov. 16, 2004, now Pat. No. 7,278,297.

(60) Provisional application No. 60/520,500, filed on Nov. 17, 2003, provisional application No. 60/813,962, filed on Jun. 15, 2006.

(51) Int. Cl.
*G01B 5/28* (2006.01)
*G01Q 10/00* (2010.01)
*G01Q 60/24* (2010.01)
*G01Q 80/00* (2010.01)
*G01Q 90/00* (2010.01)

(52) U.S. Cl. .................. 73/105; 850/1; 850/5; 850/33; 850/40; 850/53; 850/58; 850/62; 850/63; 977/849; 977/850; 977/851; 977/860; 977/863; 977/872; 977/873; 977/876; 977/880

(58) Field of Classification Search .................. 73/105, 73/661; 850/1, 5, 33, 40, 53, 58, 62, 63; 977/849, 850, 851, 860, 863, 872, 873, 875, 977/876, 880

See application file for complete search history.

(56) References Cited

U.S. PATENT DOCUMENTS 5,461,907 A * 10/1995 Tench et al. .................. 73/105

(Continued)

OTHER PUBLICATIONS

Garneir, N. et al., "Optical Manipulation of Microscale Fluid Flow", Physical Review Letters, vol. 91, No. 5, Aug. 1, 2003, pp. 79-86.*

(Continued)

*Primary Examiner*—Daniel S Larkin
(74) *Attorney, Agent, or Firm*—Clements Bernard PLLC; Christopher L. Bernard; Lawrence A. Baratta, Jr.

(57) ABSTRACT

The present invention provides a self-sensing tweezer device for micro and nano-scale manipulation, assembly, and surface modification, including: one or more elongated beams disposed in a first configuration; one or more oscillators coupled to the one or more elongated beams, wherein the one or more oscillators are operable for selectively oscillating the one or more elongated beams to form one or more "virtual" probe tips; and an actuator coupled to the one or more elongated beams, wherein the actuator is operable for selectively actuating the one or more elongated beams from the first configuration to a second configuration.

21 Claims, 8 Drawing Sheets

U.S. PATENT DOCUMENTS

| | | | |
|---|---|---|---|
| 6,246,054 B1 * | 6/2001 | Toda et al. | 250/306 |
| 6,862,921 B2 * | 3/2005 | Chand et al. | 73/105 |
| 6,955,078 B2 * | 10/2005 | Mancevski et al. | 73/105 |
| 2002/0005062 A1 * | 1/2002 | Matsuki et al. | 73/104 |
| 2003/0011389 A1 * | 1/2003 | Nakayama et al. | 324/727 |

OTHER PUBLICATIONS

Guthold, M. et al., "Controlled Manipulation of Molecular Sample with the nanoManipulator", IEEE/ASME Transactions of Mechatronics, vol. 5, No. 2, Jun. 2000, pp. 189-198.*

Resch, R. et al., "Manipulation of Gold Nanoparticles in Liquid Environments Using Scanning Force Microscopy", Ultramicroscopy, vol. 82, 2000, pp. 135-139.*

Bauza M.B., Hocken R.J., Smith S.T., Woody S.C., 2005, Development of a virtual probe tip with an application to high aspect ratio microscale features. Rev. Sci. Instrum. 76, 095112.

Basarab G., Ka'roly J., Pe'ter B., Ferene I., Gabor F., 2003, Magnetic tweezers for intracellular applications, Review of Scientific Instruments, 74 (9), 4158-4163.

Akita S., Nakayama Y., 2002, Manipulation of nanomaterial by carbon nanotube nanotweezers in scanning probe microscope, Japanese Journal of Applied Physics, Part 1: 41 (6), 4242-4245.

Schirmeisen A., Cross G., Stalder A., Grutter P., Durig U., 2000, Metallic adhesion forces and tunneling between atomically defined tip and sample, Applied surface science, 157 (4), 274-279.

Fatikow S., Seyfried J., Fahlbusch S., Buerkle A. & Schmoeckel F., 2000, A flexible microrobot based microassembly station, Journal of intelligent and robotic systems, 27, 135-169.

Shen Y., Xi N., Lai W., Li W., 2004, A novel PVDF microforce/force rate sensor for practical application in micromanipulation, Sensor Review, 24 (3), 274-393.

Nicholas Garneir, Roman O. Grigoriev, & Michael F. Schatz, 2003. Optical Manipulation of microscale fluid flow, Physical Review Letters, vol. 91, No. 5, pp. 054501-1 through 054501-4.

* cited by examiner

SELF-SENSING TWEEZER DEVICES AND ASSOCIATED METHODS FOR MICRO AND NANO-SCALE MANIPULATION AND ASSEMBLY

CROSS-REFERENCE TO RELATED APPLICATION(S)

The present non-provisional patent application claims the benefit of priority of U.S. Provisional Patent Application No. 60/813,962, filed on Jun. 15, 2006, and entitled "Self Sensing Tweezers for Micro-Assembly and Manipulation," the contents of which are incorporated in full by reference herein. The present non-provisional patent application also claims the benefit of priority of U.S. Provisional Patent Application No. (unassigned), filed on May 25, 2007, and entitled "Standing Wave Probes for Measurement, Manipulation and Modification Across Dimensional Scales," the contents of which are also incorporated in full by reference herein. The present non-provisional patent application is further a continuation-in-part of U.S. patent application Ser. No. 10/989,744 (now U.S. Pat. No. 7,278,297), filed on Nov. 16, 2004, and entitled "An Oscillating Probe With a Virtual Probe Tip," which claims the benefit of priority of U.S. Provisional Patent Application No. 60/520,500, filed on Nov. 17, 2003, and entitled "An Oscillating Probe With a Virtual Probe Tip," the contents of which are further incorporated in full by Reference herein.

FIELD OF THE INVENTION

The present invention relates generally to the application of an oscillating probe technology in one or more dimensions to micro and nano-scale manipulation and assembly. More specifically, the present invention relates to self-sensing tweezer devices and associated methods for micro and nano-scale manipulation and assembly.

BACKGROUND OF THE INVENTION

Micro and nano-scale manipulation and assembly techniques have become more important in many industries in recent years, as the fabrication of smaller systems has become more desirable. Some researchers have addressed this micro and nano-scale manipulation and assembly issue by investigating non-contact manipulation and assembly techniques, such as by levitating components (i.e. through the use of electromagnetic and optical tweezers, for example). Currently, the major limitation or challenge with respect to these electromagnetic and optical tweezers is the size of the devices themselves. Electromagnetic and optical tweezers are often relatively large and, as a result, their applicability is limited to relatively large unobstructed areas, with limited ability to manipulate or place objects in or relative to features such as narrow channels and cavities.

For any manipulation and assembly technique, there is a need for force detection capability integral with the gripping mechanism. The objective is to enable force feedback in order to detect the presence of components and prevent damage to the fragile components. For example, micro-mirrors in the assembly of optical switches typically break when the gripping forces exceed a few micro-Newtons. As a result, micro-manipulator technologies require sensing capability in order to provide force feedback, with maximum applied forces less than this threshold. For example, one device has been developed that has the ability to sense force, but the micro-sensor is static and, therefore, still susceptible to attraction forces between the micro-manipulator and the specimen or component. In general, self-sensing tweezers with the ability to overcome attraction forces and incorporating force sensing would lead to new manufacturing and assembly process capabilities and, therefore, lower production costs.

BRIEF SUMMARY OF THE INVENTION

In various exemplary embodiments, the present invention provides an innovative micro-manipulation tool using an oscillating probe technology that enables the simultaneous sensing and control of interaction forces in order to ensure reliable manipulation and assembly operations. As used herein, the terms "manipulation" and "assembly" are understood to contemplate manipulation, assembly, and or surface modification. The micro-manipulation tool of the present invention is based on an oscillating probe technology that is used for the measurement of high-aspect ratio micro-scale features, for example. Because this oscillating probe technology often operates with a steady sinusoidal excitation resulting in a characteristically stationary deformation mode shape that varies in amplitude harmonically with each oscillation period, it is also referred to as a "standing wave probe" technology. For the purposes of the present invention, it is the ability to apply a dynamically varying force t6 one or more probes that represents an important attribute of the contemplated embodiments. The oscillating probe technology is adapted to use one or more standing wave probes and implement them as a micro-manipulator. Key advantages of the oscillating probe technology include the ability for the micro-manipulator to have self-sensing capability, enabling the detection of a specimen or component, and the ability to overcome problems associated with the presence of attraction forces between the tips of the tweezers and the specimen or component, for example.

In addition to meeting the above-referenced needs, this technology can function as a measurement tool as well as a micro-manipulator and enable surface modification. This stems from the force feedback capability, which also provides the capability for dimensional metrology during the manipulation or assembly process. In general, this force feedback is used to set a desired force while holding and manipulating, for example, and also to sense the presence of the specimen or component. This later aspect is important in determining if the specimen or component is released, for example.

In one exemplary embodiment, the present invention provides a self-sensing tweezer device for micro and nano-scale manipulation and assembly, including: one or more elongated beams disposed in a first configuration; one or more oscillators coupled to the one or more elongated beams, wherein the one or more oscillators are operable for selectively oscillating the one or more elongated beams; and an actuator (which can, optionally, be integral with the one or more oscillators) coupled to the one or more elongated beams, wherein the actuator is operable for selectively actuating the one or more elongated beams from the first configuration to a second configuration. Preferably, the one or more elongated beams consist of one or more micro or nano-scale elongated beams. The one or more elongated beams each include a tip portion that, when oscillated, defines a "virtual" probe tip of the elongated beam. As used herein, the terms "oscillator," "oscillating," "oscillated," and "oscillation" are understood to contemplate the application of a dynamically varying displacement, via oscillation, impulse, an arbitrary waveform, etc. Each of the one or more elongated beams is configured to engage a specimen or component via one or more of an interaction (i.e. physical, meniscus, etc.) force and an attraction force when not oscillated. Each of the one or more elongated beams is configured to engage a specimen or component via only an interaction force when oscillated. Preferably, the self-sensing tweezer device also includes a circuit operable for receiving force feedback from the one or more elongated beams. Optionally, the self-sensing tweezer device further includes one or more positioning mechanisms coupled to one or more of the one or more elongated beams and a specimen or component, wherein the one or more positioning mechanisms are operable for selectively positioning the one or more elongated beams with respect to the specimen or component.

In another exemplary embodiment, the present invention provides a self-sensing tweezer method for micro and nano-scale manipulation and assembly, including: providing one or more elongated beams disposed in a first configuration; providing one or more oscillators coupled to the one or more elongated beams, wherein the one or more oscillators are operable for selectively oscillating the one or more elongated beams; and providing an actuator (which can, optionally, be integral with the one or more oscillators) coupled to the one or more elongated beams, wherein the actuator is operable for selectively actuating the one or more elongated beams from the first configuration to a second configuration. Preferably, the one or more elongated beams consist of one or more micro or nano-scale elongated beams. The one or more elongated beams each include a tip portion that, when oscillated, defines a "virtual" probe tip of the elongated beam. Again, as used herein, the terms "oscillator," "oscillating," "oscillated," and "oscillation" are understood to contemplate the application of a dynamically varying displacement, via oscillation, impulse, an arbitrary waveform, etc. Each of the one or more elongated beams is configured to engage a specimen or component via one or more of an interaction (i.e. physical, meniscus, etc.) force and an attraction force when not oscillated. Each of the one or more elongated beams is configured to engage a specimen or component via only an interaction force when oscillated. Preferably, the self-sensing tweezer method also includes providing a circuit operable for receiving force feedback from the one or more elongated beams. Optionally, the self-sensing tweezer method further includes providing one or more positioning mechanisms coupled to one or more of the one or more elongated beams and a specimen or component, wherein the one or more positioning mechanisms are operable for selectively positioning the one or more elongated beams with respect to the specimen or component.

In a further exemplary embodiment, the present invention provides a method for manipulating, assembling, and/or surface modifying a micro or nano-scale specimen or component, including: providing one or more micro or nano-scale beams each having a tip portion coupled to both one or more oscillators operable for selectively oscillating the one or more beams (independently or in concert) and a discrete or integrally formed actuator operable for selectively actuating the one or more beams from a first configuration to a second configuration; disposing the tip portions of the one or more beams about a specimen or component; interacting the tip portions of the one or more beams with a surface of the specimen or component via the actuation of the actuator; oscillating the one or more beams in order to overcome any attraction forces between the tip portions of the one or more beams and the specimen or component; and removing the tip portions of the one or more oscillating beams from interaction with the surface of the specimen or component via the actuation of the actuator. Optionally, the method also includes translating the one or more beams relative to the specimen or component between the interacting and oscillating steps.

Alternatively, the present invention provides a method for manipulating, assembling, and/or surface modifying a micro or nano-scale specimen or component, including: providing one or more micro or nano-scale beams each having a tip portion coupled to both one or more oscillators operable for selectively oscillating the one or more beams and a discrete or integrally formed actuator operable for selectively actuating the one or more beams from a first configuration to a second configuration; oscillating the one or more beams in order to overcome any attraction forces between the tip portions of the one or more beams and a specimen or component; disposing the tip portions of the one or more oscillating beams about the specimen or component; interacting the tip portions of the one or more oscillating beams with a surface of the specimen or component such that a measured nominal interaction force value is achieved via the actuation of the actuator; and removing the tip portions of the one or more oscillating beams from interaction with the surface of the specimen or component via the actuation of the actuator. Optionally, the method also includes translating the plurality of oscillating beams relative to the specimen or component between the interacting and removing steps.

In a still further exemplary embodiment, the present invention provides a device for manipulating, assembling, and/or surface modifying a micro or nano-scale specimen or component, including: one or more tweezer tips; one or more actuators operable for dynamically moving the one or more tweezer tips, thereby creating an interaction force between the one or more tweezer tips and the specimen or component when the one or more tweezer tips and the specimen or component are brought into proximity; one or more sensors operable for measuring the interaction force between the one or more tweezer tips and the specimen or component; and one or more motion control actuators operable for selectively bringing the one or more tweezer tips and the specimen or component into proximity.

It is to be understood that both the foregoing general description and the following detailed description provide exemplary embodiments of the present invention, and an overview or framework for understanding the nature and character of the present invention as it is claimed. The accompanying drawings are included in order to provide a further understanding of the present invention, and are incorporated into and constitute a part of this specification. The accompanying drawings illustrate the various exemplary embodiments of the present invention and, together with the detailed description, serve to explain the principles of operation thereof. The accompanying drawings are meant to be illustrative, and not limiting.

BRIEF DESCRIPTION OF THE DRAWINGS

The present invention is illustrated and described herein with reference to the various drawings, in which like reference numbers are used to denote like device components and/or method steps, as appropriate, and in which.

DETAILED DESCRIPTION OF THE INVENTION

In general, the self-sensing tweezer device of the present invention employs one or more (e.g. one, two, three, or more) standing wave fibers or the like in order to create a micro-manipulator tool. Preferably, this tool has long, slender grips, thereby enabling the high-aspect ratio manipulation, assembly, and/or surface modification of micro and nano-scale specimens or components. The incorporation of force feedback enables the micro-manipulator fingers to be self sensing, thereby capable of detecting when a specimen or component is present, or to what extent it has been surface modified. Additionally, the variable energy that can be supplied to the interaction interface by the standing wave probe technology provides a desirable means for overcoming interaction forces. Moreover, force sensing enables the self-sensing tweezer device to be used as a dimensional measurement tool. All of these are attributes of the standing wave probe technology. Although the description below primarily addresses micro-scale tweezers, for purposes of illustration, the standing wave probe technology is inherently scaleable for nano-scale applications and, as a result, can be applied to both micro and nano-scale problems. The description below illustrates the implementation of a standing wave using a tuning fork assembly and a single carbon fiber probe and the extension of this configuration and concept to one or more (e.g. one, two, three, or more) standing wave fibers for use as a micro-manipulator.

Figure 1:
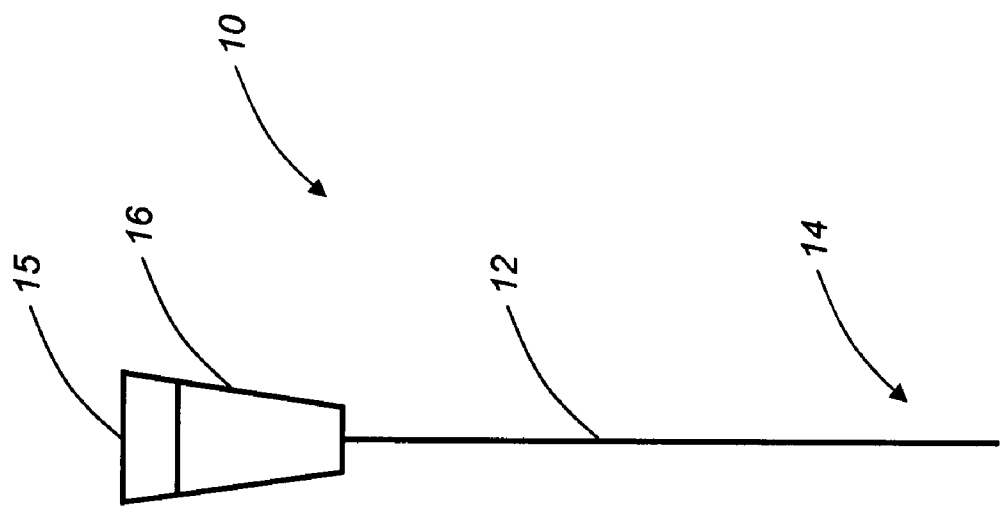
FIG. 1 is a planar view of one exemplary embodiment of the standing wave probe of the present invention, the standing wave probe including a relatively high-aspect ratio beam with an oscillating tip at the free end and an oscillator and actuator at the fixed end (or other location)
Figure 2:
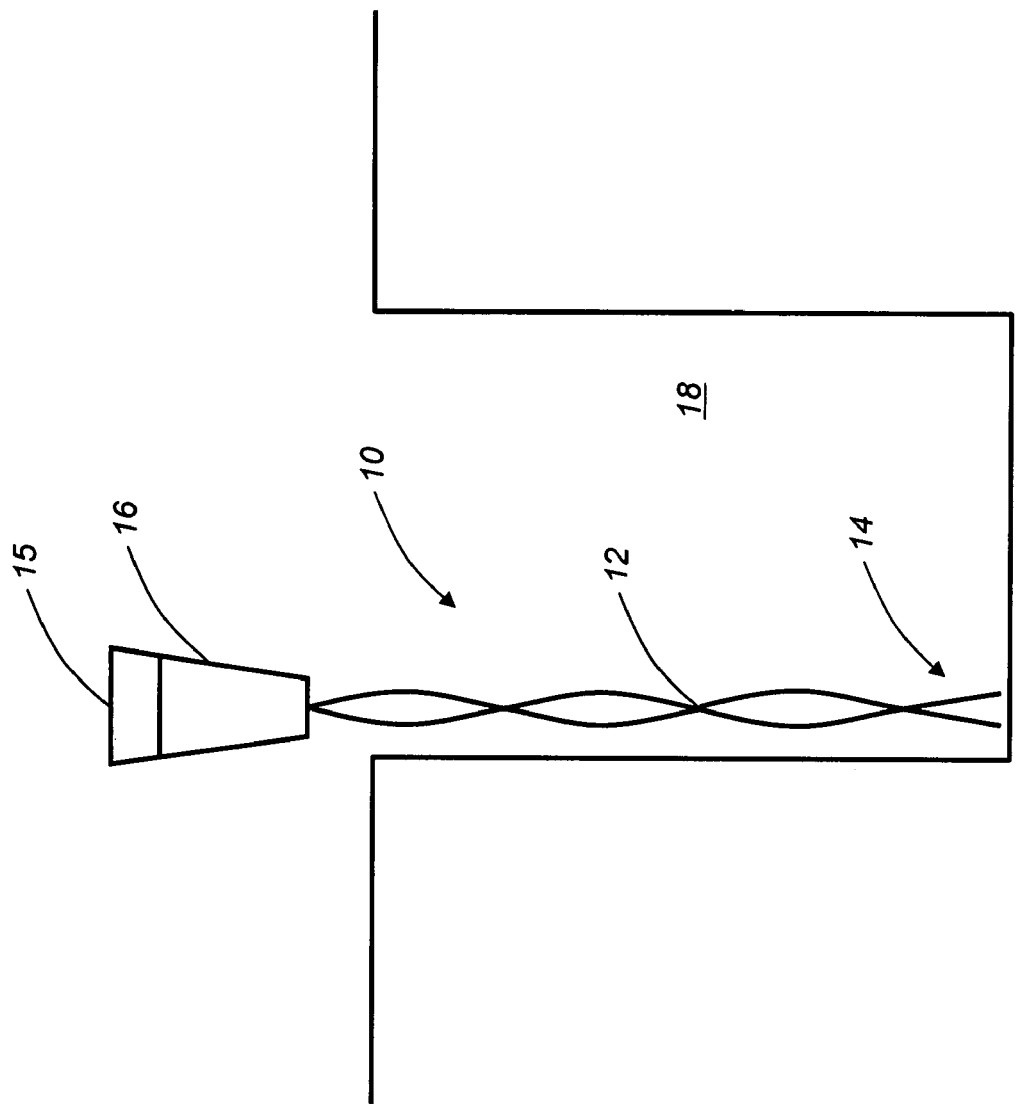
FIG. 2 is another planar view of the standing wave probe of FIG. 1, the relatively high-aspect ratio beam being inserted into a hole or bore and an oscillation applied thereto, thereby forming a standing wave.
Figure 3:
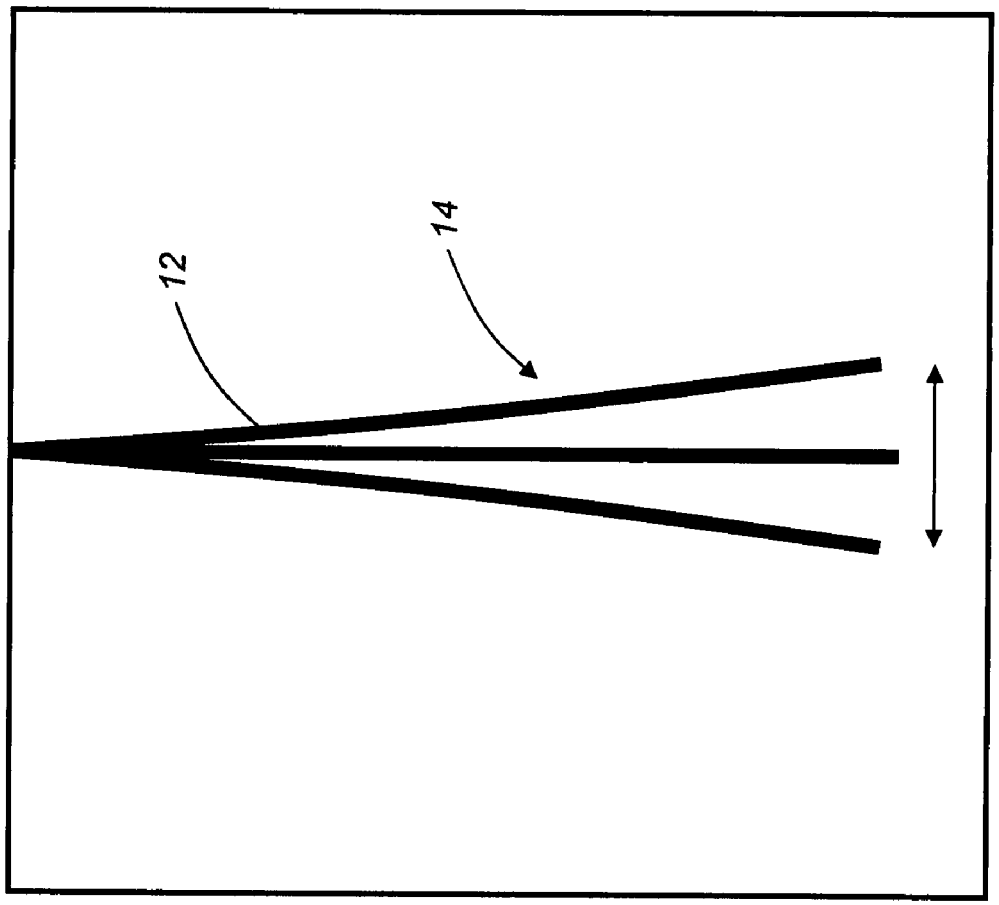
FIG. 3 is a further planar view of the standing wave probe of FIGS. 1 and 2, illustrating the oscillation at the tip of the free end of the relatively high-aspect ratio beam (i.e. at the "virtual" probe tip)

Referring to FIGS. 1-3, the standing wave probe 10 of the present invention includes a relatively high-aspect ratio (e.g. exceeding about 500:1) beam 12 with an oscillating tip 14 at the free end. The free length of the beam 12 in this exemplary embodiment is about 5 mm and the shaft diameter is about 7.5 µm. It should be noted that, as such standing wave probes are scaled downwards in size, these specifications necessarily vary greatly. For example, for nano-scale applications, an aspect ratio on the order of 50:1, or even 5:1, may be more appropriate. All such variations are contemplated by the present invention. The fixed end of the beam 12 is attached to one tine of a tuning fork crystal oscillator 16 or the like, which is oscillated at about 32 kHz, for example. Again, it should be noted that, as such standing wave probes are scaled downwards in size, these specifications necessarily vary greatly. For example, for nano-scale applications, an oscillation frequency on the order of 32 MHz may be more appropriate. All such variations are contemplated by the present invention. Preferably, the input signal to the oscillator 16 is an AC frequency close to the resonant frequency of the oscillator 16 that creates a standing wave in the attached fiber 12, a transient signal, or the like. Again, as used herein, the terms "oscillator," "oscillating," "oscillated," and "oscillation" are understood to contemplate the application of a dynamically varying displacement, via oscillation, impulse, an arbitrary waveform, etc. Optionally, the standing wave probe 10 also includes a motion control actuator 15 that is operable for translating, extending/retracting, rotating, and/or tilting the beam 12. This motion control actuator 15 can be a discrete component, or it can be integrally formed with the oscillator 16.

As illustrated in FIGS. 2 and 3, the single or multi-direction oscillation of the beam 12 causes a point on the free end to move farther away from the beam 12. In other words, the free end of the beam 12 moves the greatest distance laterally as compared to any other location along the length of the beam 12, providing a method by which the oscillating tip 14 forms a "virtual" probe tip (e.g. that, in this or other applications can be interacted with a side of a hole or bore 18 in order to obtain measurements). In practice, the input signal parameters, amplitude, frequency, phase, etc. are adjustable, providing a programmable oscillation amplitude at the free end of the beam 12 ranging from a few microns up to several tens of microns, for example. The oscillating, or otherwise dynamically displaced, tip 14 stores enough energy to overcome adhesive interactions and does not stick to the surface(s) being interacted. These concepts are applicable to single and multi-fiber micro and nano-manipulators.

The above-referenced method of operation primarily describes a single fiber generating a standing wave. This method of operation is now extended to standing wave tweezers, for example. In this case one, two, three, or more fibers are each attached to separate oscillators/actuators that produce simultaneous probe motions. It should be noted that the dynamically varying displacement of each fiber can be the same or different (and can vary with time), as can the translation and/or extension/retraction. As a result, a wide variety of manipulation, assembly, surface modification, force sensing, and measurement choreographies can be achieved, such as grasping, extension/retraction, translation, rotation, inclination/declination, sculpting, etc. of a specimen or component. For example, through the precise control of input frequency, phase, and amplitude, a specimen or component can be picked up and rotated within the probe. Considering this approach, two types of operating modes can be used, and include an Off-On mode and an On-On mode.

Figure 4:
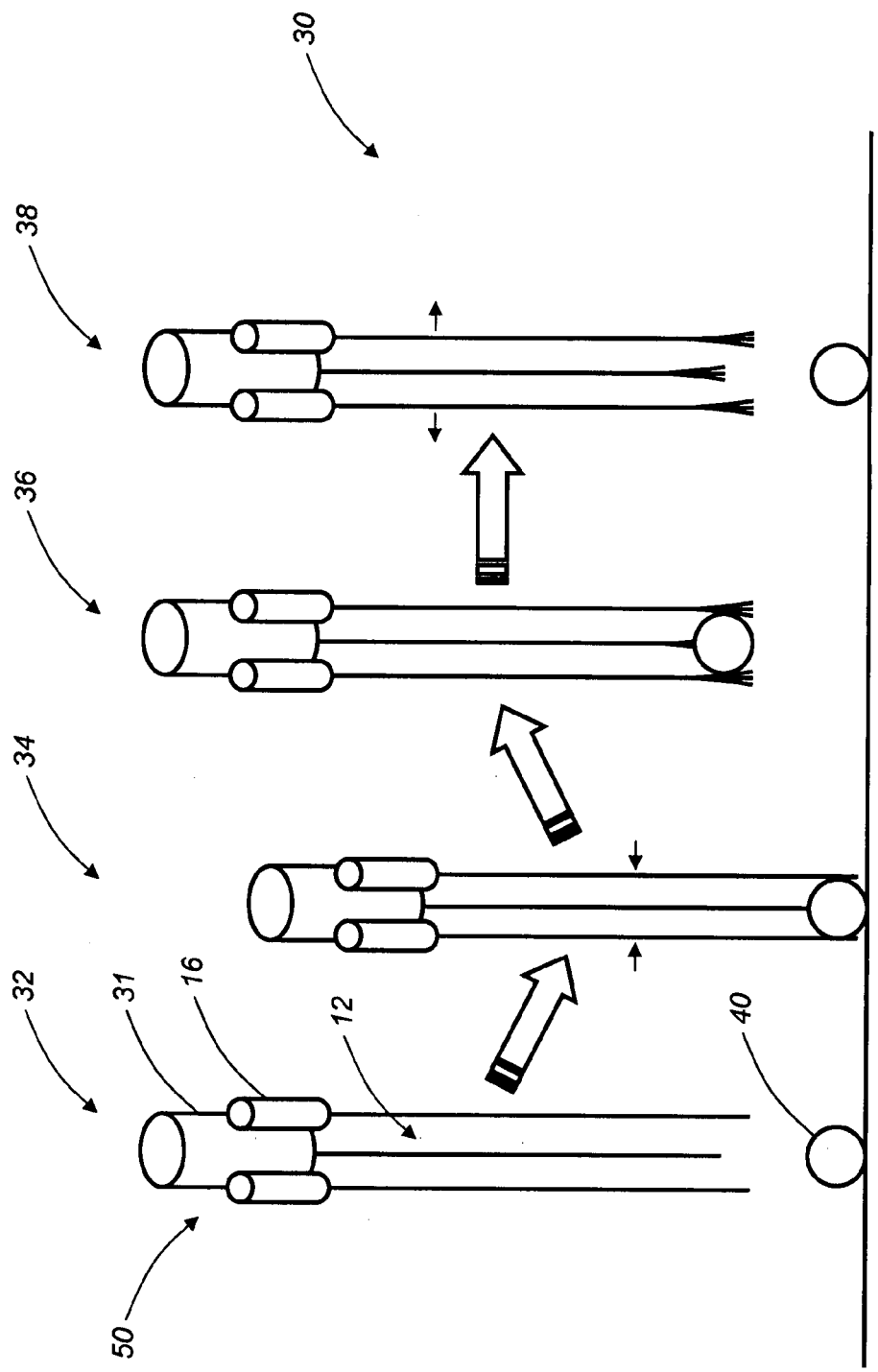
FIG. 4 is a schematic diagram illustrating, step-by-step, an On-Off mode for operating the self-sensing tweezers of the present invention, the self-sensing tweezers being used to grasp and manipulate a micro or nano-scale specimen.

Referring to FIG. 4, in the Off-On mode 30, the exemplary tweezers 50 are fashioned from three parallel fibers 12 equi-spaced by 120 degrees from each other. It will be readily apparent to those of ordinary skill in the art that other fiber counts and configurations can be utilized. For example, the fibers 12 can have any suitable cross-sectional shapes, and these cross-sectional shapes can vary along the lengths of the fibers 12, the fibers 12 need not be parallel, etc. In general, the "elongated beams" and "fibers" of the present invention can include any generally elongated structures (i.e. including masses selectively disposed (mass variations) along their lengths, consisting of similar or dissimilar materials along their lengths, etc.). Thus, any relatively slender structure can be used to provide an oscillatory motion at the point of gripping. The oscillators 16 to which the fibers 12 are attached are coupled to an actuator 31, which enables the fibers 12 to contract and expand from a coaxial center axis or point, in this configuration. Sequence #1 32 shows the three fibers 12 turned off (i.e. not operating in the standing wave mode). Next, in sequence #2 34, the three fibers 12 surround the spherical specimen 40 and displace towards the specimen 40 using the actuator 31. The specimen 40 is then picked up using interaction or attraction forces and moved to a new location, for example. Sequence #3 36 shows the three fibers 12 turned on (i.e. operating in the standing wave mode, for example, such that the specimen 40 no longer "sticks" to the fibers 12), however, the actuator 31 is still closed, such that the specimen 40 is not released. Finally, sequence #4 38 shows the released specimen 40, the three fibers 12 displace outwards, while the standing wave vibration, for example, prevents the specimen 40 from "sticking" to the fiber surfaces. As a result, the specimen 40 is controllably released from the tweezers 50.

Figure 5:
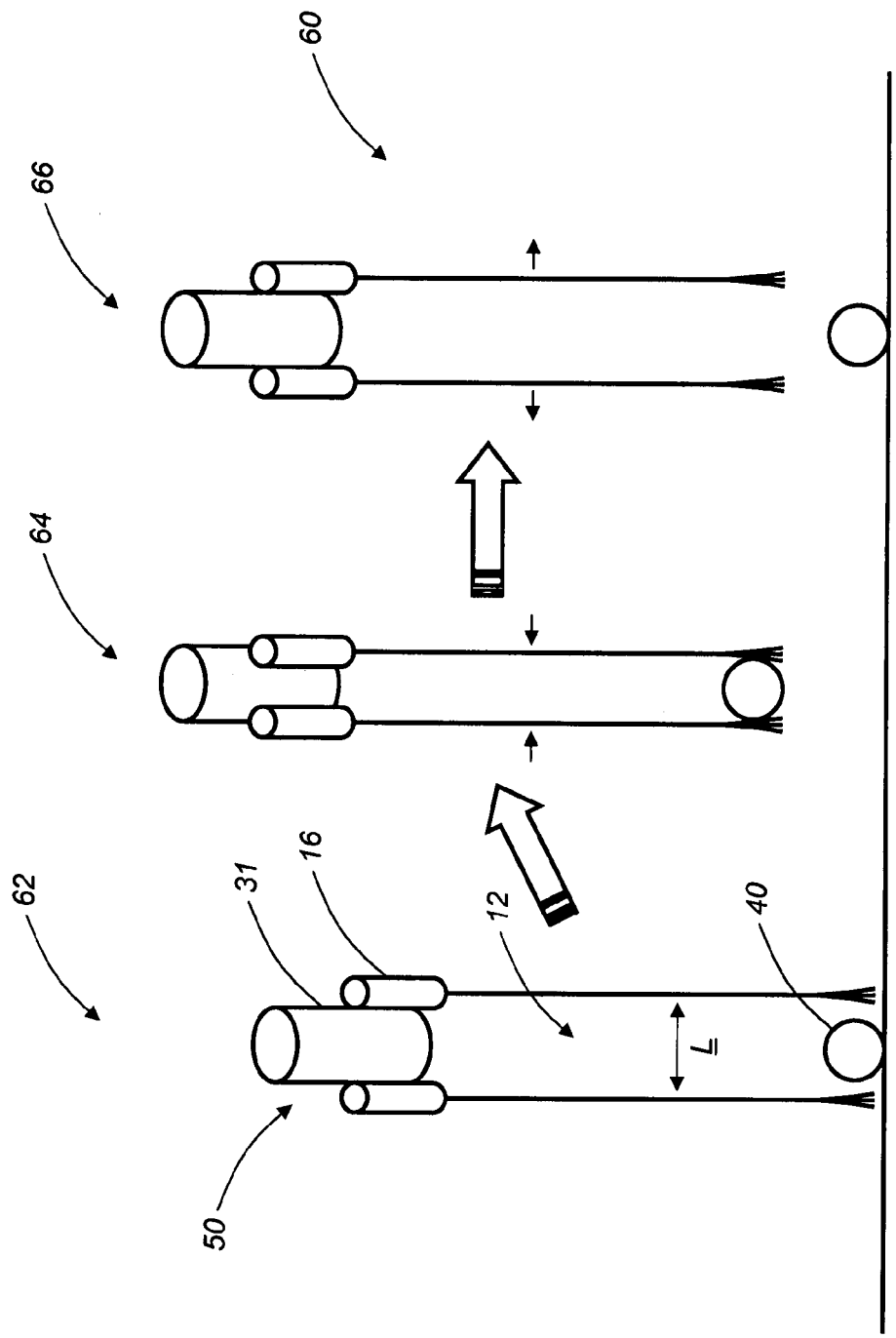
FIG. 5 is a schematic diagram illustrating, step-by-step, an On-On mode for operating the self-sensing tweezers of the present invention, the self-sensing tweezers being used to grasp and manipulate a micro or nano-scale specimen.

Referring to FIG. 5, a second strategy is referred to as an On-On mode 60. In this mode 60, the fibers 12 generate a continuous standing wave, for example, during the complete interaction with the specimen 40. Two fibers 12 are attached to the actuator 31 and the objective of the actuator 31 is to change the displacement, L, between the two fibers 12. In Sequence #1 62, the two fibers 12 are lowered on either side of the specimen 40 and the actuator 31 is contracted such that length L is reduced. Considering that the tweezers 50 will provide self sensing, the actuator 31 is retracted until a nominal force value between the specimen 40 and tips of the tweezers 50 is achieved (via a phase-locked loop (PLL) circuit or the like). In this manner, the specimen 40 can be picked up from the surface while the standing wave, for example, is kept in the "on" position in sequence #2 64. Finally, sequence #3 66 moves the specimen 40 to a new location and the actuator 31 increases length L such that the fibers 12 move away from the specimen 40. At this point, the specimen 40 will not "stick" to the tips of the tweezers 50 because the standing wave, for example, is still activated. Therefore, the tips of the tweezers 50 continue to expand away from the specimen 40 until no force is detected in the tweezers 50. The benefit of this approach is that the tips of the tweezers 50 continuously generate a self-sensing force and, as a result, force feedback is always detected. It is noted that moving the specimen substrate while the specimen is gripped and released also results in relative motion of the specimen and is equivalent to the pick-and-place operation outlined above.

The oscillating probe methods of the present invention provide distinct advantages over conventional micro-manipulator tools. Specifically, the oscillating probe methods overcome adhesive interactions between the specimen and the tweezers, are readily scaleable for micro and nano-technology applications, provide relatively high aspect ratios and the ability to maneuver a specimen into challenging features, provide programmable amplitude tips, utilize one or multidimensional oscillation normal to a specimen's surface and provide better clamping interaction, yield methods for force detection between the specimen and the tips, and enable measurement capability between the specimen and the tips.

A relatively simple experiment was conducted to illustrate the above-referenced standing wave methods. A carbon fiber with a free length of about 5 mm and a diameter of about 7.5 µm was bonded to a crystal oscillator. A PLL circuit was used to drive the tuning fork near resonance, which corresponds to about 32 kHz. The output of the tuning fork was transferred to the PLL circuit and the objective of the PLL circuit was to keep the tuning fork locked to a constant phase or frequency. Therefore, a change in amplitude (i.e. corresponding between input and output signals from the tuning fork) corresponded to an applied force interaction between the fiber tip and the specimen. Once the single fiber was assembled, two types of preliminary tests were performed to evaluate the standing wave methods employed as one arm of the self-sensing tweezers. This experiment briefly evaluated surface interactions with a specimen, as well as acting as the self-sensing tweezers.

First, a micro-scale specimen was picked up using attraction forces and it was observed if the specimen would release by generating a standing wave in the 7.5 µm-diameter fiber. The fiber was first moved into close proximity with the specimen while the fiber was not vibrating. In the second step, the fiber and the specimen were brought into interaction and the specimen stuck to the fiber because of attraction forces. This enabled the specimen to be picked up, indicated by the surface being below a focal plane in visual observations. Next, the specimen, while still in interaction with the fiber, was moved away from the surface, which was evident by the further blurring of the background. Finally, the tuning fork was oscillated, thereby generating a standing wave in the fiber and releasing the specimen. This simplified experiment clearly illustrated that the specimen overcomes attraction forces and releases from the fiber once the standing wave is generated in the fiber.

Figure 6:
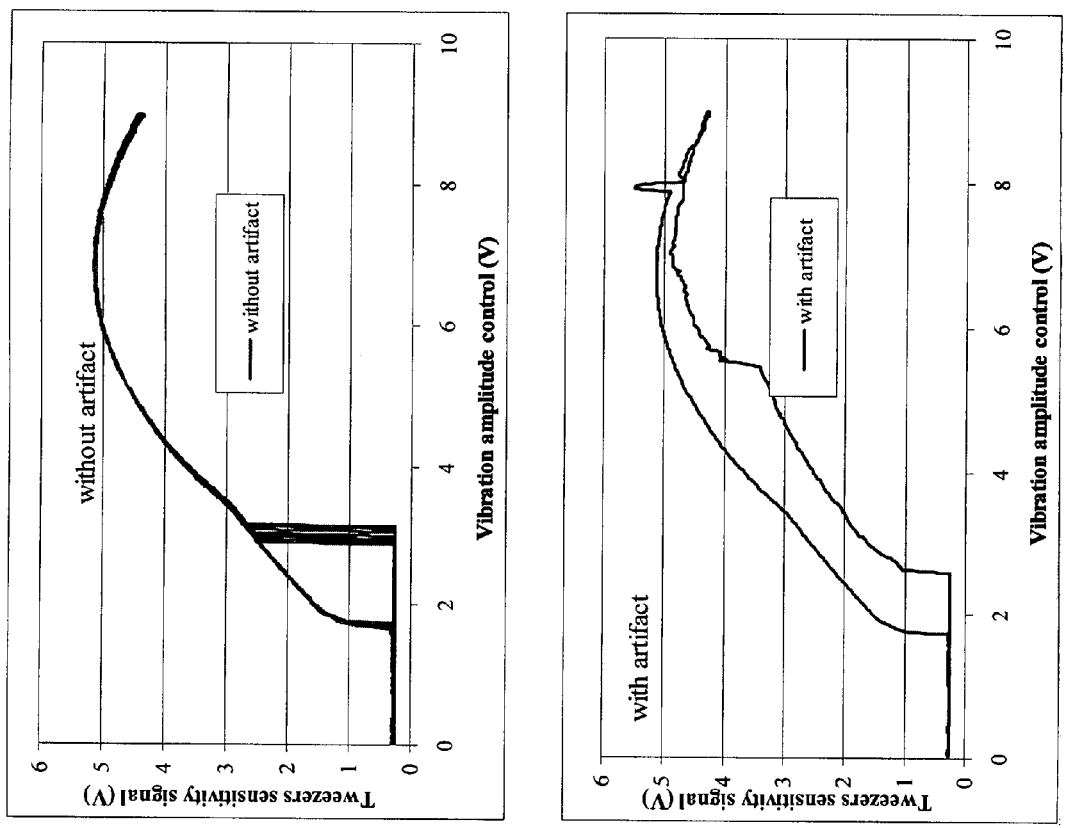
FIG. 6 is a series of plots of the fiber probe signal as a function of the input frequency of the tuning fork for a given experiment.

During one of these pick and release cycles, the fiber's signal was monitored to determine if the tuning fork's signal changed once the specimen was released. The tuning fork's amplitude signal was measured using the PLL circuit and was compared with a signal characteristic of the tuning fork's output in the absence of the attached specimen. Referring to FIG. 6, the tuning fork's frequency increased towards the first mode of natural frequency, which corresponded to about 7 V along the x-axis. During the first cycle, there was a fluid drop on the fiber tip. The increase in signal at about 3V represented the point where enough energy was inputted into the tuning fork and fiber such that the standing wave was formed. The lower part of the curve corresponded to when the fluid drop was attached to the fiber tip and the upper part of the curve corresponded to when the fluid drop was released from the fiber tip. Moreover, a large signal spike during the first cycle occurred at about 8 V on the x-axis and was related to the moment when the droplet was finally released from the fiber tip. Additionally, this event was confirmed by simultaneously observing the fiber and specimen under a stereo microscope. Once released, the tuning forks' output signal shifted upward to a different signal characteristic. This occurred because the specimen was no longer coupled to the standing wave fiber and, therefore, the fiber oscillated in a "free" state. Furthermore, the input frequency to the tuning fork was cycled up and down ten times while the fiber was producing a standing wave in this "free" state. These ten cycles repeated quite well and are shown in FIG. 6. Thus, the tuning fork's output signal was influenced by a mechanical coupling between the fiber and specimen. As a result, the plot clearly demonstrates a different characteristic when the specimen is attached as compared to when the specimen is released. It was also apparent that there was a distinct signal characteristic at the point of release and the "free" probe characteristic fully recovered, indicating that insignificant moisture had been retained after the release.

Figure 7:
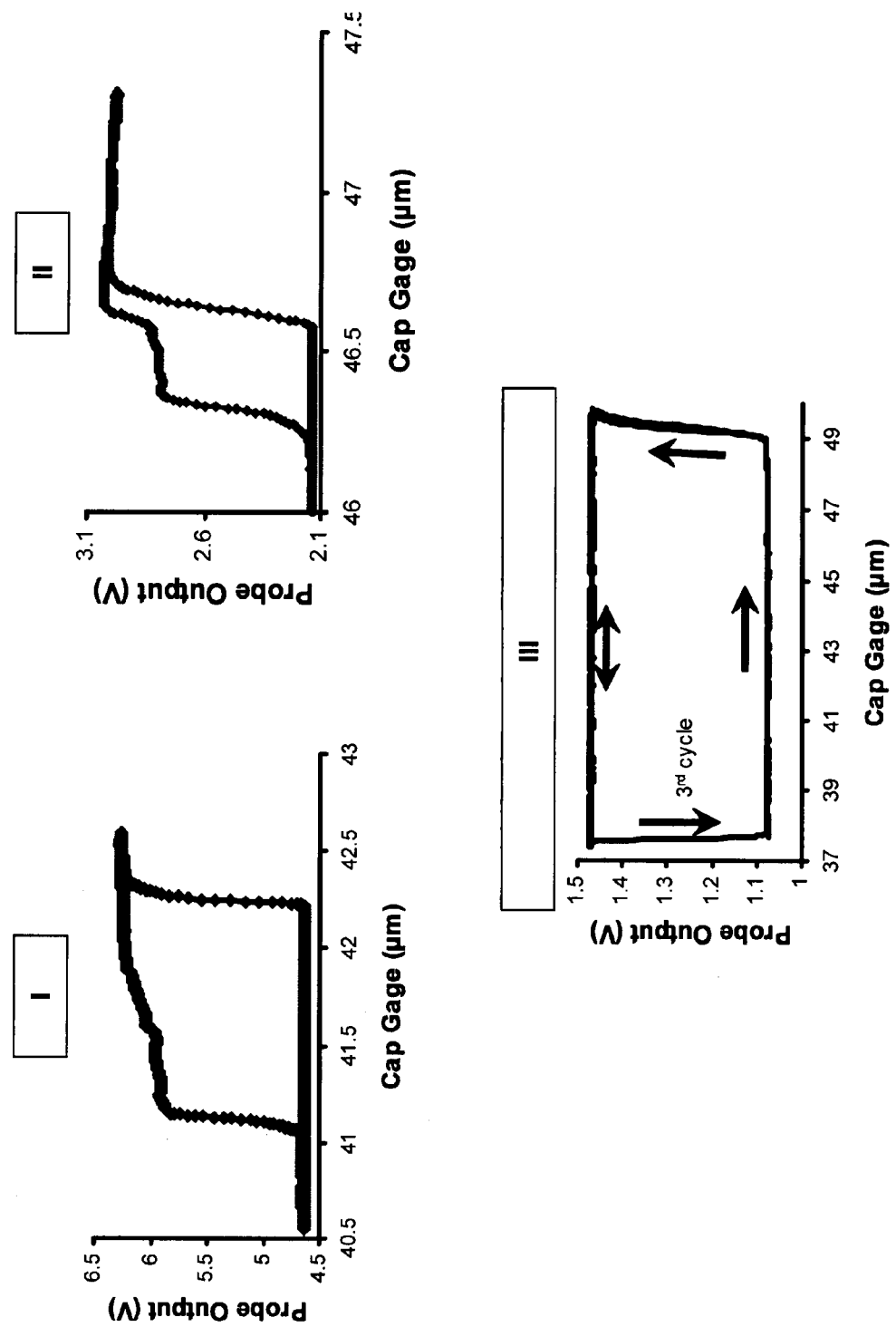
FIG. 7 is a series of plots of the resonating probe output signal as a function of the approach of the probe base towards a steel surface in air with different tuning fork excitation voltages of about 5 V, about 2 V, and about 1 V, respectively, for a given series of experiments.

The three plots shown in FIG. 7 illustrate data obtained in the laboratory for the approach of a resonating fiber to a rigidly-clamped surface. The probe consisted of a thin glass fiber of approximately 3 mm length and approximately 10 µm diameter attached to one of the tines of a tuning fork resonator. The tuning fork was, in turn, attached to a piezoelectric translator, with the motion of the translator monitored by a capacitance gauge. During the experiments, the fiber was translated towards a steel surface, in air, until interaction was detected. It was then retracted until the probe was released from the surface. Typically, five or more cycles were monitored and, in general, the characteristics were found to repeat. Additionally, this was repeated for three different excitation voltages of about 5 V, about 2 V, and about 1 V, respectively, corresponding to the results shown in FIG. 7. The input signal controlled the oscillation amplitudes and, therefore, the energies in the probe tip. As the input voltage was decreased, a standing wave was still produced, however, at some point there was enough energy stored in the fiber to overcome the attraction forces.

For all cases, when the probe was hanging freely, the sensor output corresponded to the lower, horizontal portion of the plots. Upon interaction, there was a relatively rapid increase in the probe signal, the amplitude of this increase being dependent upon the excitation voltage applied to the tuning fork. The magnitude of the responses from the free state to fully interacted were about 1.8 V, about 0.9 V, and about 0.4 V, respectively, demonstrating a non-linearity at higher excitation voltages. Upon retracting the probe, there was a distinct hysteresis, with a kink being apparent in the first two plots. In air, there was a liquid film on the surface that was at a different electrical potential than the probe. Hence, the dominant forces upon retraction were those of chemical cohesion, electrostatic attraction, and the meniscus forces. Retraction forces on either side of the unloading curve kink were typically considered to be the cohesion forces followed by the necking and subsequent release from the meniscus.

At the higher excitation voltages, the tuning fork was retracted a distance of about 1-2 µm before the reverse bending of the probe shank in combination with the oscillation of the probe were sufficient to overcome the cohesion and meniscus forces. However, in the last plot, the excitation was lowered such that it was below a "threshold" and the probe was permanently adhered to the surface. In fact, the tuning fork was retracted a maximum distance of about 12 µm without releasing from the specimen surface. After retracting for a third cycle, an impulse was applied to the apparatus upon which the probe was released. Upon returning into interaction, the probe was again found to become attached. This clearly demonstrated the use of an oscillating probe for releasing interaction and the dependence of this on the amplitude of oscillation with a release threshold.

Figure 8:
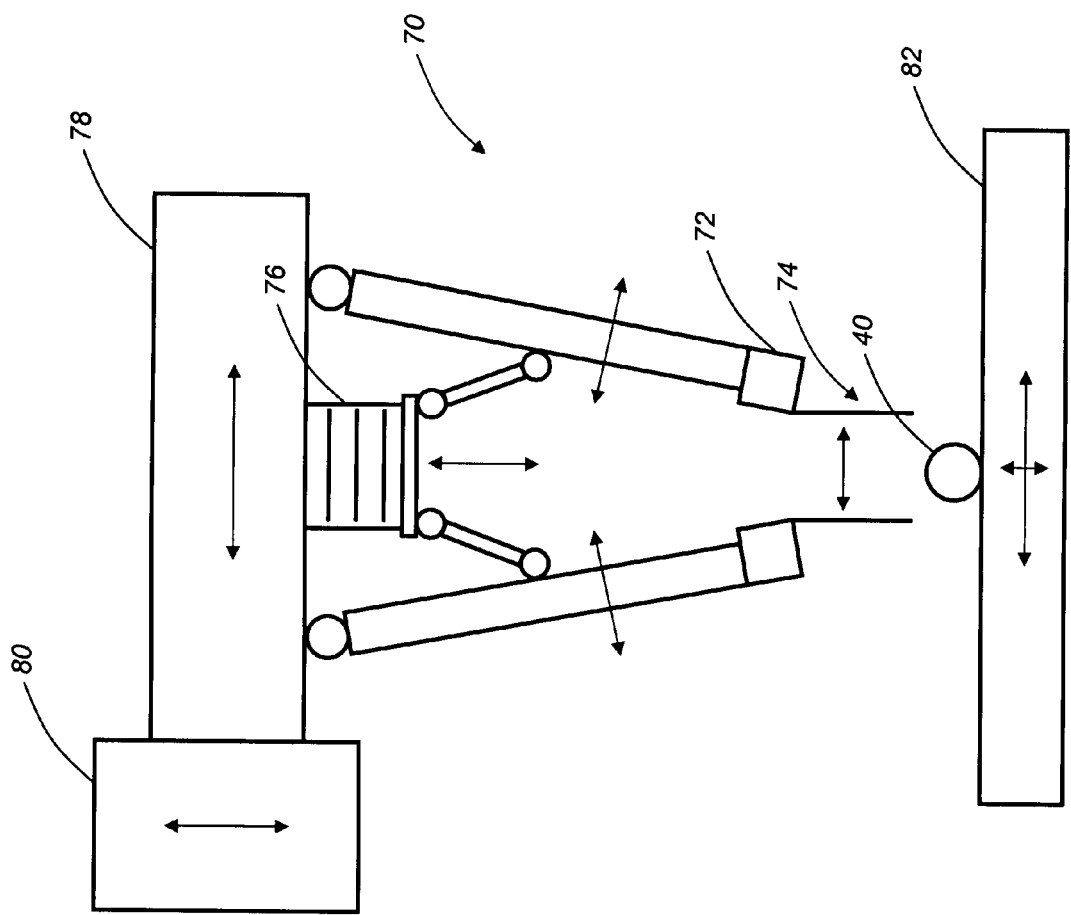
FIG. 8 is a planar view of one exemplary embodiment of an apparatus for implementing the micro-manipulator methodologies of the present invention.

Referring to FIG. 8, an apparatus 70 for implementing the micro-manipulator methodologies of the present invention includes, for example, two oscillators 72 and two carbon fibers 74 coupled to the two oscillators 72. The oscillators 72 and carbon fibers 74 are hingedly coupled to a motion control actuator 76, such as a piezoelectric actuator, a feed screw motor, a hydraulic/pneumatic piston, a selectively deformable material, or the like, operable for selectively moving the carbon fibers 74 together or apart via its deployment. The oscillators 72, carbon fibers 74, and motion control actuator 76 are all coupled to an X-Y stage 78, which, in turn, is coupled to a Z-stage 80. Thus, the carbon fibers 74 can be selectively positioned relative to the specimen 40. In this manner, the assembly responds similarly to conventional tweezers, which grasp and un-grasp specimens. The specimen 40 rests on top of a five-axis motion control system 92, for example. This enables easy positioning of the specimen 40 relative to the tweezers. Once the carbon fibers 74 are aligned with the specimen 40, the assembly 70 is used in either the Off-On mode or the On-On mode, for example.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. A device for micro and nano-scale manipulation and assembly, comprising:
   one or more elongated beams disposed in a first configuration;
   one or more oscillators coupled to the one or more elongated beams, wherein the one or more oscillators are operable for selectively oscillating the one or more elongated beams; and
   an actuator coupled to the one or more elongated beams, wherein the actuator is operable for selectively actuating the one or more elongated beams from the first configuration to a second configuration;
   wherein the one or more elongated beams each comprise a tip portion that, when oscillated, defines a "virtual" probe tip of the elongated beam, wherein a shape of the "virtual" probe tip is defined by both a characteristic shape of oscillation of the tip portion and a geometry of the elongated beam.

2. The device of claim 1, wherein the one or more elongated beams comprise one or more micro-scale elongated beams.

3. The device of claim 1, wherein the one or more elongated beams comprise one or more nano-scale elongated beams.

4. The device of claim 1, wherein each of the one or more elongated beams is configured to engage a specimen or component via one or more of an interaction force and an attraction force when not oscillated.

5. The device of claim 1, wherein each of the one or more elongated beams is configured to engage a specimen or component via only an interaction force when oscillated.

6. The device of claim 1, further comprising a circuit operable for receiving force feedback from the one or more elongated beams.

7. The device of claim 1, further comprising one or more positioning mechanisms coupled to one or more of the one or more elongated beams and a specimen or component, wherein the one or more positioning mechanisms are operable for selectively positioning the one or more elongated beams with respect to the specimen or component.

8. The device of claim 1, wherein the one or more oscillators and the actuator are integrally formed with one another.

9. A method for micro and nano-scale manipulation and assembly, comprising:
   providing one or more elongated beams disposed in a first configuration;
   providing one or more oscillators coupled to the one or more elongated beams, wherein the one or more oscillators are operable for selectively oscillating the one or more elongated beams; and
   providing an actuator coupled to the one or more elongated beams, wherein the actuator is operable for selectively actuating the one or more elongated beams from the first configuration to a second configuration;
   wherein the one or more elongated beams each comprise a tip portion that, when oscillated, defines a "virtual" probe tip of the elongated beam, wherein a shape of the "virtual" probe tip is defined by both a characteristic shape of oscillation of the tip portion and a geometry of the elongated beam.

10. The method of claim 9, wherein the one or more elongated beams comprise one or more micro-scale elongated beams.

11. The method of claim 9, wherein the one or more elongated beams comprise one or more nano-scale elongated beams.

12. The method of claim 9, wherein each of the one or more elongated beams is configured to engage a specimen or component via one or more of an interaction force and an attraction force when not oscillated.

13. The method of claim 9, wherein each of the one or more elongated beams is configured to engage a specimen or component via only an interaction force when oscillated.

14. The method of claim 9, further comprising providing a circuit operable for receiving force feedback from the one or more elongated beams.

15. The method of claim 9, further comprising providing one or more positioning mechanisms coupled to one or more of the one or more elongated beams and a specimen or component, wherein the one or more positioning mechanisms are operable for selectively positioning the one or more elongated beams with respect to the specimen or component.

16. The method of claim 9, wherein the one or more oscillators and the actuator are integrally formed with one another.

17. A method for interacting with a micro or nano-scale specimen or component, comprising:
providing one or more micro or nano-scale beams each having a tip portion coupled to both one or more oscillators operable for selectively oscillating the one or more beams and a discrete or integrally formed actuator operable for selectively actuating the one or more beams from a first configuration to a second configuration;
disposing the tip portions of the one or more beams about a specimen or component;
interacting the tip portions of the one or more beams with a surface of the specimen or component via the actuation of the actuator;
oscillating the one or more beams in order to overcome any attraction forces between the tip portions of the one or more beams and the specimen or component; and
removing the tip portions of the one or more oscillating beams from interaction with the surface of the specimen or component via the actuation of the actuator;
wherein the tip portion of each of the one or more micro or nano-scale beams, when oscillated, defines a "virtual" probe tip of the micro or nano-scale beam, wherein a shape of the "virtual" probe tip is defined by both a characteristic shape of oscillation of the tip portion and a geometry of the micro or nano-scale beam.

18. The method of claim 17, further comprising translating the one or more beams relative to the specimen or component between the interacting and oscillating steps.

19. A method for interacting with a micro or nano-scale specimen or component, comprising:
providing one or more micro or nano-scale beams each having a tip portion coupled to both one or more oscillators operable for selectively oscillating the one or more beams and a discrete or integrally formed actuator operable for selectively actuating the one or more beams from a first configuration to a second configuration;
oscillating the one or more beams in order to overcome any attraction forces between the tip portions of the one or more beams and a specimen or component;
disposing the tip portions of the one or more oscillating beams about the specimen or component;
interacting the tip portions of the one or more oscillating beams with a surface of the specimen or component such that a measured nominal interaction force value is achieved via the actuation of the actuator; and
removing the tip portions of the one or more oscillating beams from interaction with the surface of the specimen or component via the actuation of the actuator;
wherein the tip portion of each of the one or more micro or nano-scale beams, when oscillated, defines a "virtual" probe tip of the micro or nano-scale beam, wherein a shape of the "virtual" probe tip is defined by both a characteristic shape of oscillation of the tip portion and a geometry of the micro or nano-scale beam.

20. The method of claim 19, further comprising translating the one or more oscillating beams relative to the specimen or component between the interacting and removing steps.

21. A device for interacting with a micro or nano-scale specimen or component, comprising:
one or more tips;
one or more actuators operable for dynamically moving the one or more tips, thereby creating an interaction force between the one or more tips and the specimen or component when the one or more tips and the specimen or component are brought into proximity;
one or more sensors operable for measuring the interaction force between the one or more tips and the specimen or component; and
one or more motion control actuators operable for selectively bringing the one or more tips and the specimen or component into proximity;
wherein each of the one or more tips, when dynamically moved, defines a "virtual" tip, wherein a shape of the "virtual" tip is defined by both a characteristic shape of oscillation of the tip and a geometry of the tip.

* * * * *